Dec. 9, 1924.                                                          1,518,591
S. C. McKEOWN
MAGNETO
Filed Jan. 17, 1921                    3 Sheets-Sheet 1

INVENTOR
Samuel C. McKeown
BY
A. D. T. Libby
ATTORNEY

INVENTOR
Samuel C. McKeown
BY
A. D. T. Libby
ATTORNEY

Dec. 9, 1924.

S. C. McKEOWN 1,518,591

MAGNETO

Filed Jan. 17, 1921

INVENTOR
Samuel C. Mc. Keown
BY
A. D. T. Libby
ATTORNEY

Patented Dec. 9, 1924.

1,518,591

UNITED STATES PATENT OFFICE.

SAMUEL C. McKEOWN, OF NEWARK, NEW JERSEY, ASSIGNOR TO SPLITDORF ELECTRICAL COMPANY, OF NEWARK, NEW JERSEY.

MAGNETO.

Application filed January 17, 1921. Serial No. 437,790.

*To all whom it may concern:*

Be it known that I, SAMUEL C. MCKEOWN, a citizen of the United States, residing at Newark, in the county of Essex, State of New Jersey, have invented certain new and useful Improvements in Magnetos, of which the following is a description, reference being had to the accompanying drawing and to the figures of reference marked thereon.

This invention relates to magnetos and particularly to magnetos wherein a rotor bearing isolated magnetic inductors switches the flux from a permanent magnet, in alternately opposite directions, through a soft iron core bearing a coil in order to induce a current of electricity in the coil.

The main object of this invention is to provide a neat compact and efficient magneto of the above mentioned type.

Another object of this invention is to simplify the construction of a magneto so as to provide a minimum number of parts and so as to decrease the cost of manufacture thereof.

A further object of this invention is to construct a magneto so that the parts thereof may be arranged compactly for shipping and of which the parts may be subsequently assembled with ease.

Other and further objects of this invention will appear after reading the following specification and claims in which—

In the accompanying figures, like reference characters refer to the same parts.

Figure 1:
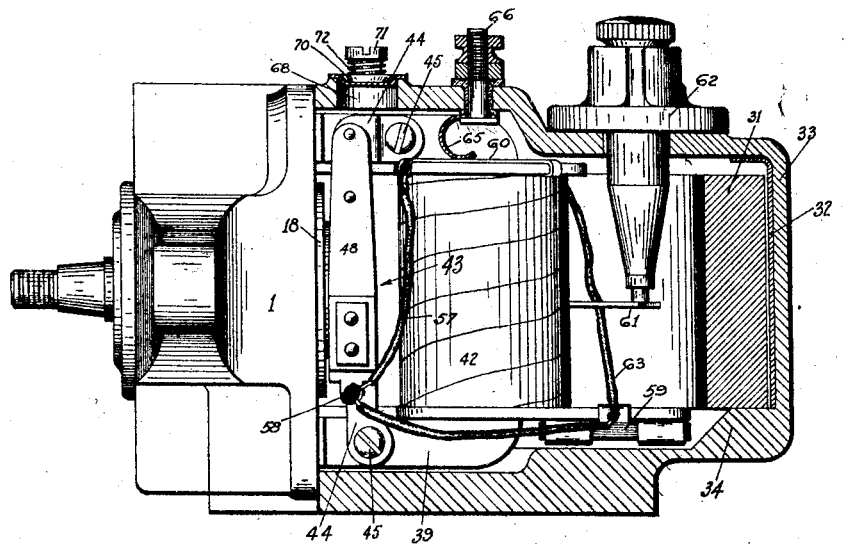
Figure 1 is a side view of my magneto, the cover and permanent magnet being shown in section so as to expose some of the interior parts.

The magneto comprises, roughly, a magneto base having sets of pole pieces embedded therein, and having journalled within the base a rotor cooperating magnetically with the pole pieces. Also associated with the sets of pole pieces and as separate units are a permanent magnet and a soft iron core bearing an induction coil and a set of make and break contacts. Secured to the base is a cover enclosing the magnet, core, coil and contacts, suitable terminals being provided to conduct the current from the coil.

Now referring more in detail to the various parts, the magneto base comprises a casting 1 of non-magnetic material such as aluminum, embedded in which are two sets of opposed pole pieces 2, 2 and 3, 3 respectively, one end of each of the pole pieces being flush with one end of the base and each of the sets 2 being built up of laminations held together by means of rivets 4, while the sets of pole pieces 3, 3 are each composed of laminations bound in together with and in between two solid blocks of soft iron 5. Cast in the aluminum base is a bearing preferably of brass, said bearing having a restricted portion 6 extending well into the base to form a support for the rotor soon to be described, and also having an enlarged portion 7 into which is driven a raceway 8 for a ball bearing of which the inner raceway 9 is driven onto the shaft of the rotor. Balls 10 complete the ball bearing. The brass bearing is provided with an oil duct 11 provided with an oil cup 12 having a spring closed cover 13. A spiral groove 14 encircles the bearing to feed oil to the armature shaft. The base is provided with a pair of ears 15 provided with apertures 16 for use when the magneto is to be used as an oscillator, as will be understood by those skilled in the art.

Figure 4:
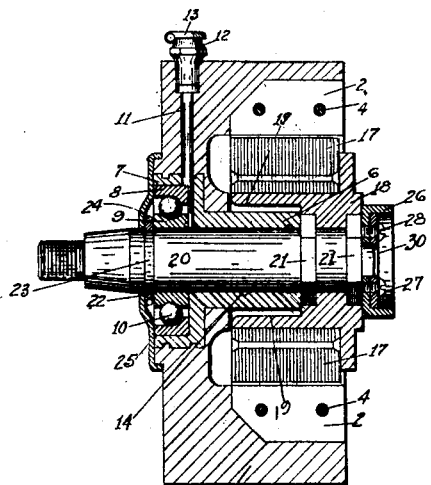
Figure 4 is a section through the base and rotor of the magneto.

The rotor is of the type wherein lobes of magnetic material are bound in with a casting of some non-magnetic material. In this instance the rotor comprises two sets of laminations 17, 17 bound in with a body of aluminum 18, the body of aluminum being cupped as at 19 so as to enable the rotor to encompass the protruding portion 6 of the bearing. Cast into the aluminum body is a shaft 20, turned down out of hexagonal stock leaving two integral hexagonal binding portions 21 as is shown in Figure 4, the aluminum body 18 being thereby rigidly held against lateral or rotative movement on the shaft 20. The shaft is held in place against longitudinal movement by means of a split ring 22 seated in a groove 23 in the shaft 20 and abutting the inner race 9, thereby also holding the race in place. A spring 24 snapped around the split portions of the ring holds them together. A cover plate 25 covers the bearing and protects the same against entrance of foreign deleterious matter. The unrestrained end of the shaft is provided with a cam 26. The cam is provided with a pair of arcuate slots 27, and a pair of screws 28 passing through holes 29 in a plate 30 and the slots 27 serve to bind the cam to the rotor in any desired adjusted position for advancing and retarding the time of make and break of the circuit controlling device soon to be described.

Associated with one pair of pole pieces as for example 3, 3 is a permanent magnet 31 held in place magnetically, and restrained in position by means of a spring 32 interposed between the magnet 31 and a cover 33, which cover, as hereinbefore stated, completely encloses the permanent magnet, an induction coil and circuit controller. The spring 32 is provided with a cut out portion 33' embracing a protuberance 34 in the cover to maintain the spring against shifting movement and projections 35 and 36 on the spring press laterally against the cover to prevent the spring from falling out when the cover is removed from the base and magnet. The cover is held down to the base by means of screws passing through holes 37 in the base and tapped into corresponding holes 38 in the cover 33.

Securely held in place against the other of the sets of pole pieces is a U-shaped laminated core 39 provided with feet 40, said feet being drilled to permit screws to pass therethrough into holes 41 in the base to secure the core to the base. Wound about the core is an induction coil 42 and mounted on the legs of the U-shaped core is a circuit controller 43. The controller comprises a brass or other non-magnetic metallic plate 44 straddling the two legs and secured to the legs by means of screws 45. One end of the plate 44 carries a contact 46. Cooperating with this contact is a second contact 47 carried by a leaf spring 48 secured to but insulated from the plate 44 by means of a fibre or other insulating block 49.

Figure 5:
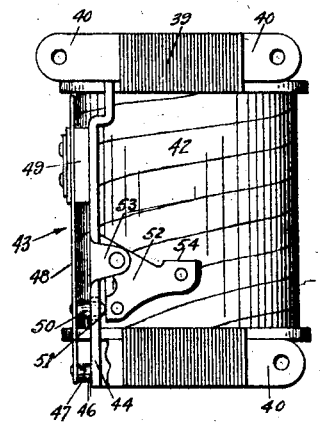
Figure 5 is a view of the core of the magneto, together with the parts carried thereby, a portion being broken away to expose some contacts.
Figure 8:
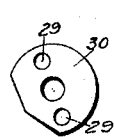
Figures 7, 8 and 9 are views of some details of my invention.
Figure 9:
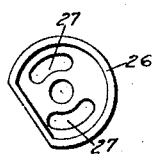
Figure 2:
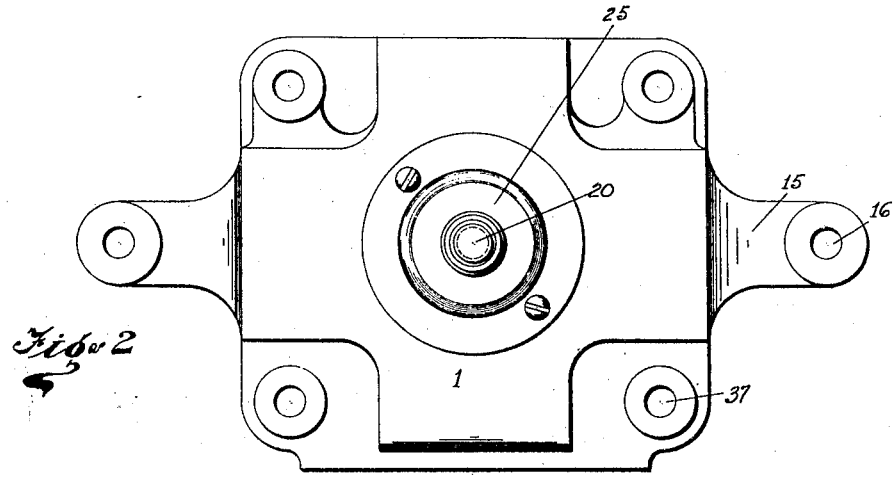
Figure 2 is an end view of the base of the magneto with the oil cup removed.
Figure 3:
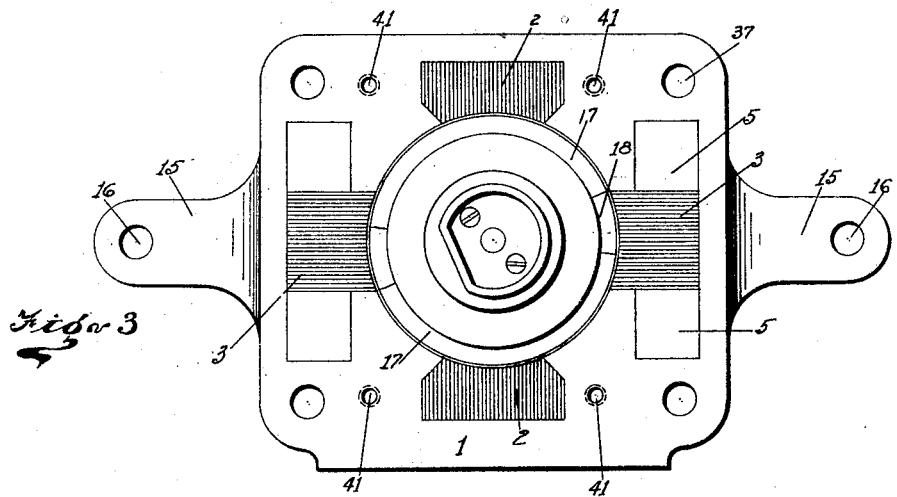
Figure 3 is a similar view of the opposite side of the base of the magneto.
Figure 7:
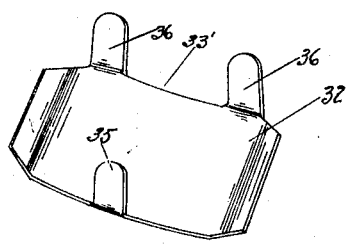
Figure 6:
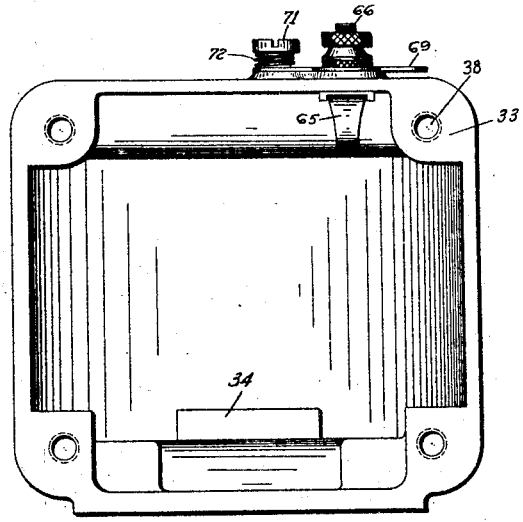
Figure 6 is a view looking toward the interior of my cover of the magneto.
Figure 10:
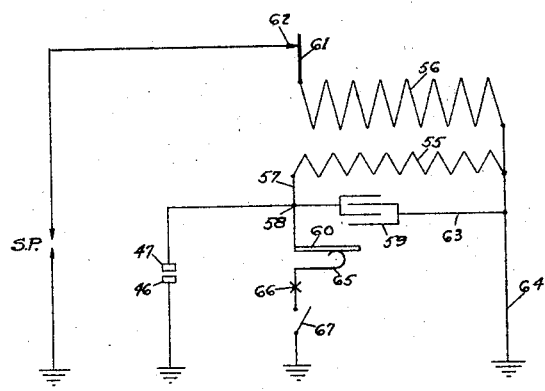
Figure 10 is a diagram of the electrical connections of my magneto and how it is to be connected in a spark plug circuit.

Riveted to the leaf spring is a stud 50 passing freely through an aperture 51 in the plate 44, and cooperating with the free end of the stud is a contact actuator 52 pivoted in a pair of ears 53 struck up from the plate 44. The actuator may be made of laminated material riveted together. It is essential that the contacts be not short circuited by the contact actuator and so in this instance the laminations forming the actuator are of fibre or other insulating material. The actuator is shaped as is shown in Figure 5 and the end 54, pressed into constant engagement with the cam 26 by the tension of the leaf spring 48, is actuated by the cam to periodically make and break the circuit controlled by the contacts. The induction coil is of the ordinary type having a primary winding 55 and a secondary winding 56. The primary winding is connected by a lead 57 to a point 58 which is in electrical connection with one side of a condenser 59 secured to one of the coil heads and to the upper contact 47 of the contacts 46, 47, as well as to a magneto grounding strip 60, secured to the other of the coil heads. The secondary winding is provided with a terminal 61, the upper end of which is in close proximity to, but not in contactual engagement with the permanent magnet to act as a safety spark gap. A terminal 62 on the cover adapted to be connected with a spark plug S. P. is in electrical engagement with the terminal 61.

The other side of the condenser through lead 63 and the other ends of the primary and secondary coil are grounded as through a wire 64. The cover is also provided with a grounding spring 65 in electrical engagement with the grounding strip 60, the binding post 66 connected with the spring 65 being adapted to be grounded through a switch 67 when it is desired to ground the magneto and render it inoperative.

The cover is also provided with an aperture 68 normally covered by a leaf 69 having a die sunk portion 70 fitting into the aperture and pivoted on a stud 71, a spring 72 serving to removably hold the leaf in place. The aperture is placed opposite the contact points so as to permit inspection of the points without dismembering the magneto.

From the above it can be seen that I have invented a particularly compact magneto having a base with but a simple unitary bearing for the rotor. The pole pieces embedded in the base being all of a uniform height can all be machined easily at one operation and the parts are so formed as to be readily separated into units for inspection, repair and replacement, and may be as readily replaced.

Having thus described my invention, I claim:

1. In a magneto, a non-magnetic base block, said block having magnet and coil core engaging pole pieces secured therein so that the magnet and coil core engaging faces of said pole pieces terminate in a common plane, and end plate for said base block, an elongated rotor bearing in said end plate projecting within the block, and a rotor encompassing the bearing having a shaft supported wholly by said bearing.

2. In a magneto, a non-magnetic base block, pairs of pole pieces secured in said block terminating in a common plane, a rotor operatively associated with said pole pieces, a core having a coil magnetically linked therewith, a permanent magnet, and means for retaining said core and permanent magnet in place in endwise contact with the pole pieces secured in the block.

3. In a magneto, a non-magnetic base block, pairs of pole pieces secured in said block terminating in a common plane, a rotor operatively associated with said pole pieces, a core having a coil magnetically linked therewith, a permanent magnet, means for retaining said core and permanent magnet in place in contact with the pole pieces secured in the block, a contact maker and breaker mounted on the core, and means on the rotor to operate the contact maker and breaker.

4. In a magneto, a base block, pairs of pole pieces therein, a rotor for said pole pieces, a core bearing a coil secured to one pair of pole pieces, said coil carrying contacts, a permanent magnet resting on and magnetically held to the other of the pole pieces, a cover for embracing said core, coil, and permanent magnet, means in said cover for additionally retaining the magnet in endwise position on the pole pieces and terminals carried by the cover to engage said coil contacts for the purpose described.

In testimony whereof, I affix my signature.

SAMUEL C. McKEOWN.